(12) United States Patent
Marais et al.

(10) Patent No.: US 8,579,375 B2
(45) Date of Patent: Nov. 12, 2013

(54) AIRCRAFT SEAT

(75) Inventors: Jean Charles Marais, Sainte Lizaigne (FR); Joel Marais, Charost (FR)

(73) Assignee: Zodiac Seats France (FR)

( * ) Notice: Subject to any disclaimer, the term of this patent is extended or adjusted under 35 U.S.C. 154(b) by 17 days.

(21) Appl. No.: 13/308,779

(22) Filed: Dec. 1, 2011

(65) Prior Publication Data

US 2012/0139300 A1  Jun. 7, 2012

Related U.S. Application Data

(60) Provisional application No. 61/418,480, filed on Dec. 1, 2010.

(51) Int. Cl.
*B60N 2/06* (2006.01)
(52) U.S. Cl.
USPC .......................................... 297/342; 297/341
(58) Field of Classification Search
USPC ................................................. 297/341–343
See application file for complete search history.

(56) References Cited

U.S. PATENT DOCUMENTS

| 5,868,470 A * | 2/1999 | Hyder et al. ............. 297/362.14 |
| 6,305,644 B1 * | 10/2001 | Beroth ........................ 244/118.5 |
| 7,165,810 B2 * | 1/2007 | McMillen .................. 297/284.4 |
| 8,313,059 B2 * | 11/2012 | Ferry et al. ................. 244/118.6 |
| 2002/0109385 A1 | 8/2002 | Marechal et al. |
| 2004/0036336 A1 | 2/2004 | Veneruso |
| 2009/0166470 A1 * | 7/2009 | Dryburgh et al. .......... 244/118.6 |

FOREIGN PATENT DOCUMENTS

| EP | 1228963 A1 | 8/2002 |
| WO | 2008107689 A1 | 9/2008 |

OTHER PUBLICATIONS

International Search Report and Written Opinion dated Apr. 18, 2012 in Application No. PCT/IB2011/002898.
International Preliminary Report on Patentability dated Jun. 13, 2013 in Application No. PCT/182011/002898.

* cited by examiner

*Primary Examiner* — Sarah B McPartlin
(74) *Attorney, Agent, or Firm* — Dean W. Russell; Kristin M. Crall; Kilpatrick Townsend & Stockton LLP

(57) ABSTRACT

Embodiments of the present invention provide adjustable or convertible seats for use in aircraft and other passenger transport vehicles. The seats are designed to use non-parallel slides and a single actuator for certain movements of the seat.

9 Claims, 11 Drawing Sheets

AIRCRAFT SEAT

This application claims the benefit of U.S. Provisional Application Ser. No. 61/418,480, filed Dec. 1, 2010, titled "Two Slides Kinematic for Premium Seat of Civil Aircraft," the entire contents of which are hereby incorporated by reference.

FIELD OF THE INVENTION

Embodiments of the present invention relate generally to a seat for a passenger transport vehicle that can adopt any number of selected positions between upright and a fully reclined, bed-like position. The seat is particularly useful as an aircraft seat for use in a business class or first class cabin, where a passenger may wish to be seated in an upright position (i.e., for taxi, take-off and landing, or for eating or working) but who may wish to convert the seat to a generally horizontal position that will allow the passenger to sleep or rest. One of the benefits provided by embodiments described herein is that the seat can be positioned without disrupting the space behind the seat. This feature is particularly useful when a privacy shell or partition is positioned directly behind the seat.

BACKGROUND

Aircraft and other passenger transport vehicle seats are often designed to allow passengers to move from a fully seated upright position to a partially or fully reclined position. These seats may allow only a slight backward motion, or they may be seats that are convertible to a bed, i.e., to a substantially flat bed position so that the passenger may lie down. Premium seats for civil aircraft are often equipped with multiple electrical actuators, which allow independent or combined motion of the seat pan and the backrest. In some instances, these seats may also be surrounded by a privacy shell or partition, which allows seat motion and other passenger movement without interrupting the space of the passenger behind.

Commercial and other aircraft are designed to make the maximum use of space. Difficulty sometimes arises when designing and arranging convertible seats so that the minimum amount of space is used to accommodate each passenger, while still providing the maximum amount of comfort possible. Accordingly, improved seats that convert between an upright and a generally flat, resting position are needed. Additionally, in order to accommodate curved seat back paths, curved privacy shells may be required. However, this solution often requires (and wastes) precious space. Accordingly, improved seats that have a generally flat backrest that can be used with a linear or straight privacy shell, but that can also convert as described above as also needed. Finally, weight, space, and maintenance considerations are always at the forefront of considerations for airlines, and thus, improved seat designs that use fewer components, weigh less, and require less maintenance are also desired.

BRIEF SUMMARY

Embodiments of the invention described herein thus provide improved seats for installation on a passenger transport vehicle, such as a commercial aircraft, where space and weight savings are at a premium.

In certain embodiments, it is preferred that, from the most upright position to the bed position, the seat pan should move forward and allow the back to recline without interfering with a privacy shell or partition that may be positioned behind the seat. In order to optimize the passenger's available space within the privacy shell at any seat position, the most aft backrest point trajectory is as close as possible to vertical.

In a specific embodiment, there is provided a positionable seat assembly for an aircraft, comprising: a movable seat pan and a movable back rest; a fixed seat base frame having a first slide and a second slide, wherein the first slide and the second slide are generally non-parallel to one another; wherein combined movement of the first and second slides is configured to guide motion of the seat pan and the backrest; and a single actuator having one end associated with the seat pan and one end associated with the backrest.

DETAILED DESCRIPTION

Embodiments of the present invention provide a seat for installation and use on-board a passenger transport vehicle, such as an aircraft, that allows for a deep recline, bed-like position, without encroaching on the space behind the seat. The seats described also allow for use of a linear or straight (i.e., uncurved) privacy shell behind the seat. Certain embodiments include a seat frame having two non-parallel slides and one actuator for the seat pan and the backrest kinematic. When the seat moves between the most upright position (sometimes referred to as "TTL" for "taxi, take-off, landing") and the bed-like position, it is desirable to optimize cabin density. One of the best ways to do this is by using kinematic motion of the seat, while ensuring that the back of the seat is as close to vertical as possible when in the TTL position.

Figure 12:
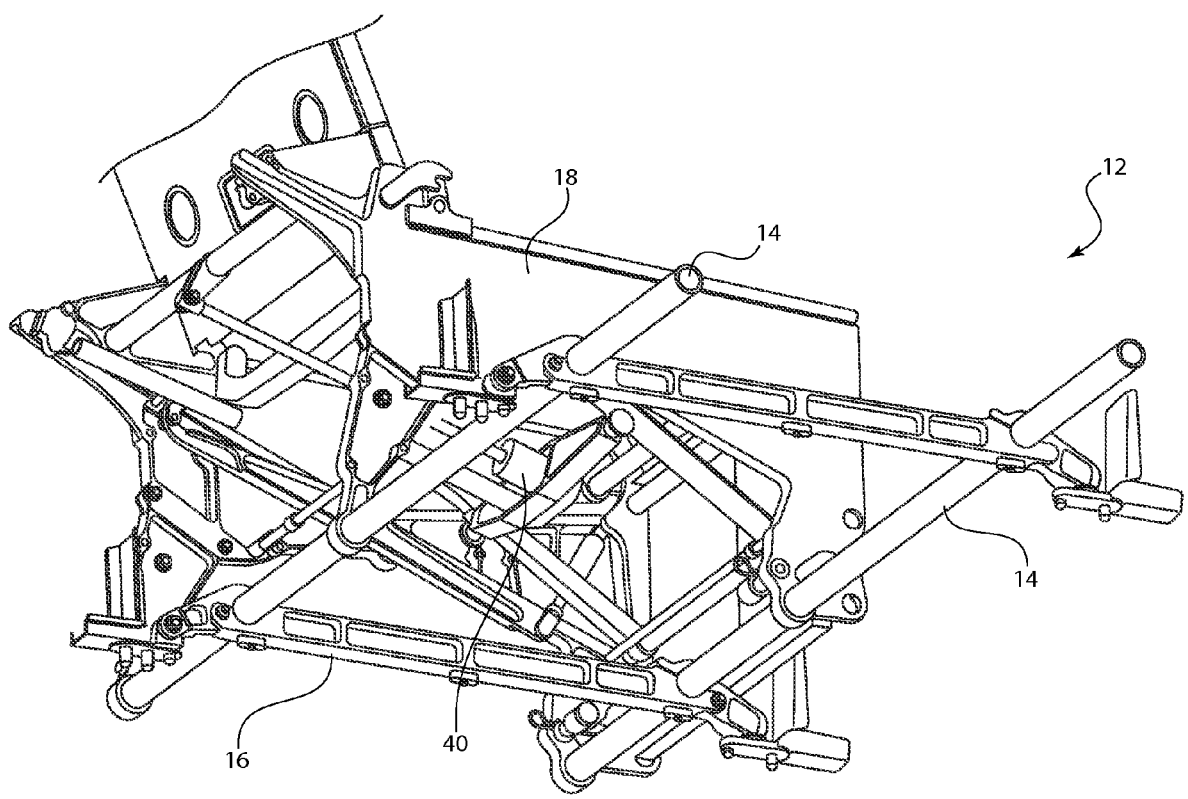
FIG. 12 shows a cross sectional view of a seat assembly in a substantially upright position.

In one embodiment, the seat is provided as a positionable seat assembly 10. Seat assembly 10 includes a fixed seat base frame 12, a movable seat portion 24, and a backrest 30. The fixed seat base frame 12 is secured to the vehicle floor. It typically includes beams 14 that are attached to a base member 16 supporting a floor track fitting, with seat legs 18 secured to the beams 14. A perspective view showing the cooperation between the beams 14, base member 16, and seat leg 18 is best illustrated by FIG. 12. Although two seat legs are used, only one is shown in the cut away views. One of the seat legs 18 is removed in the cross-sectional views shown in FIGS. 1 and 13, in order to illustrate the movable portions of the seat assembly.

Figure 1:
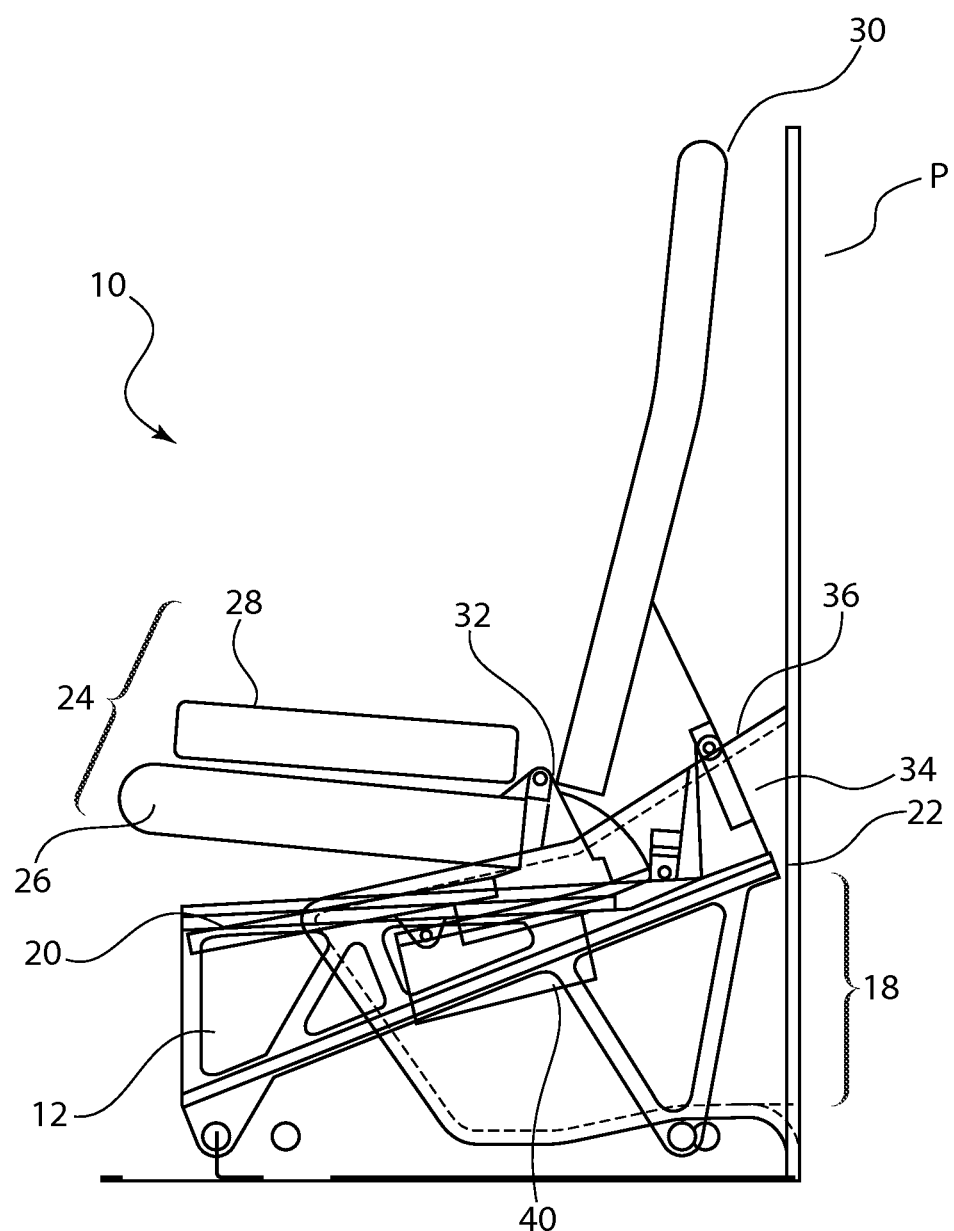
FIG. 1 shows a side cross-sectional view of a positionable seat assembly according to one embodiment of the invention.

The seat base frame 12 has a first slide 20 and a second slide 22. First and second slides 20 and 22 may be attached to the seat base frame 12 or they may be integrally formed with the base. Slides 20, 22 are provided in order to guide the motion of the movable parts of the seat. First slide 20 is generally, but not necessarily completely, horizontal. It may be angled from about 10 to about 30 degrees or more without affecting the movements described herein. In some embodiments, it is flat enough with the plane cabin floor to allow the seat to recline to a substantially and generally flat position. The second slide 22 is non-parallel to the first slide 20. As shown in FIG. 1, slide 22 may have a generally upward incline toward the back of the seat assembly.

Figure 13:
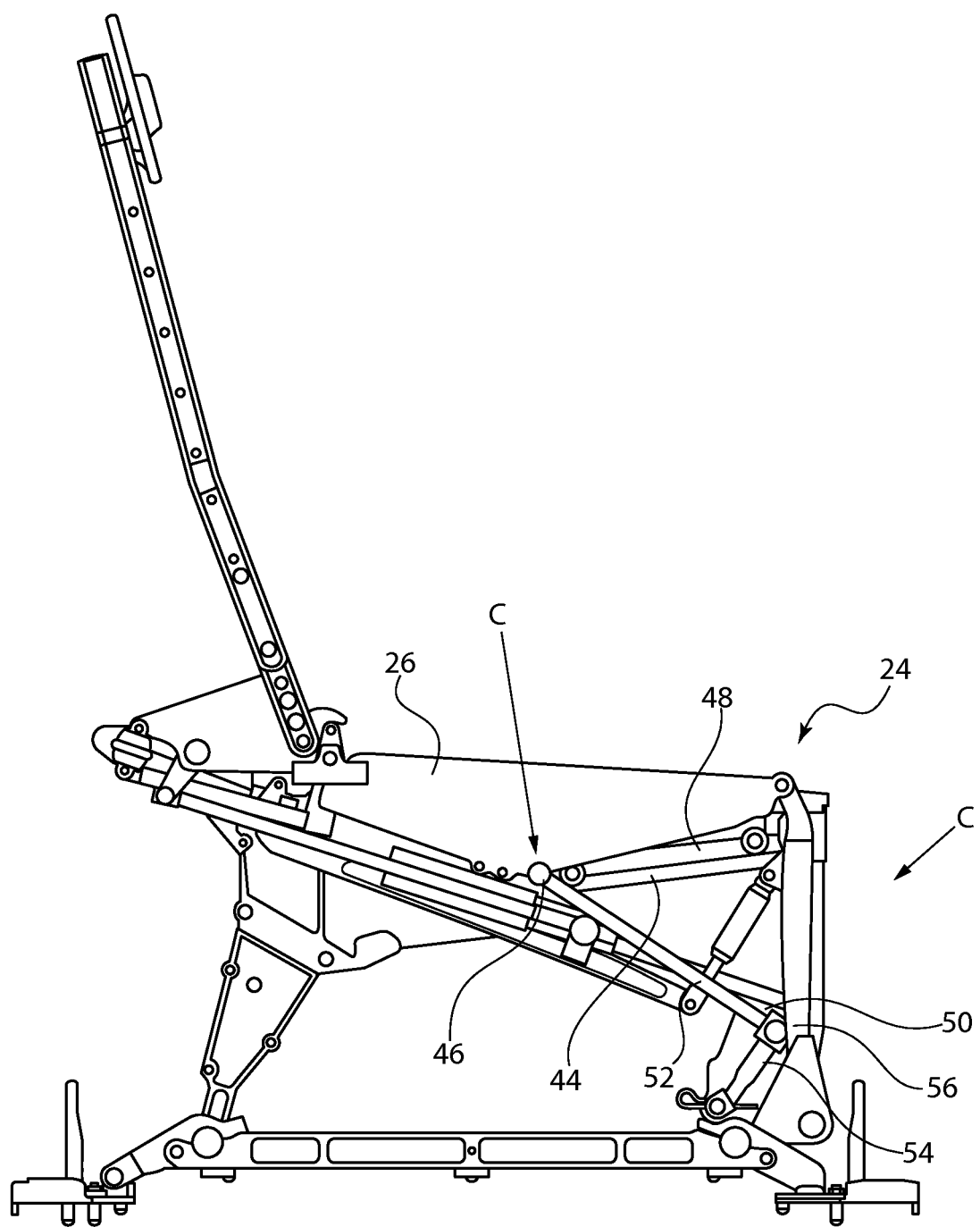
FIG. 13 shows a side cross sectional view of the seat of FIG. 12.
Figure 14:
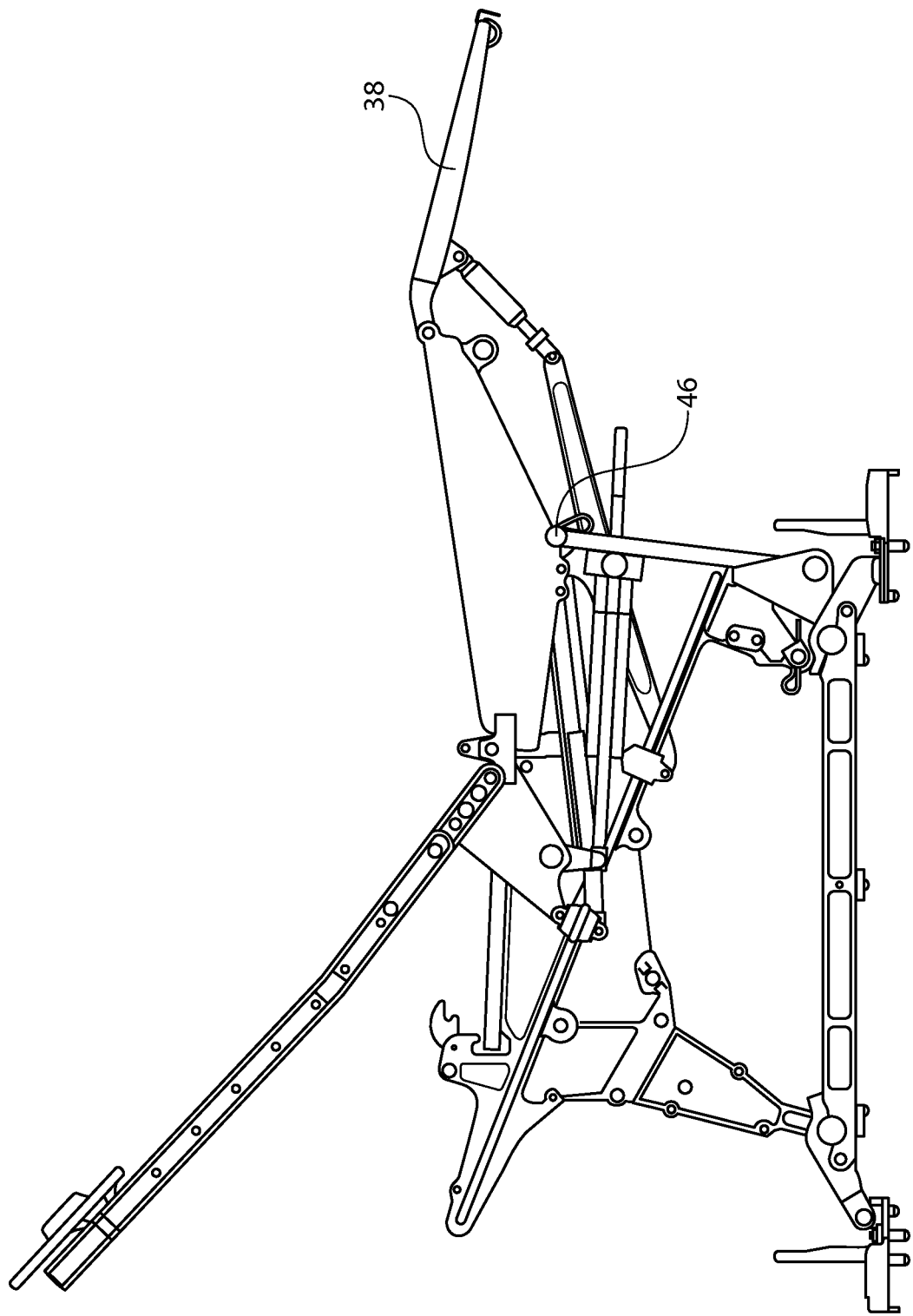
FIG. 14 shows a side cross sectional view of the seat of FIG. 12 in a reclining position.
Figure 15:
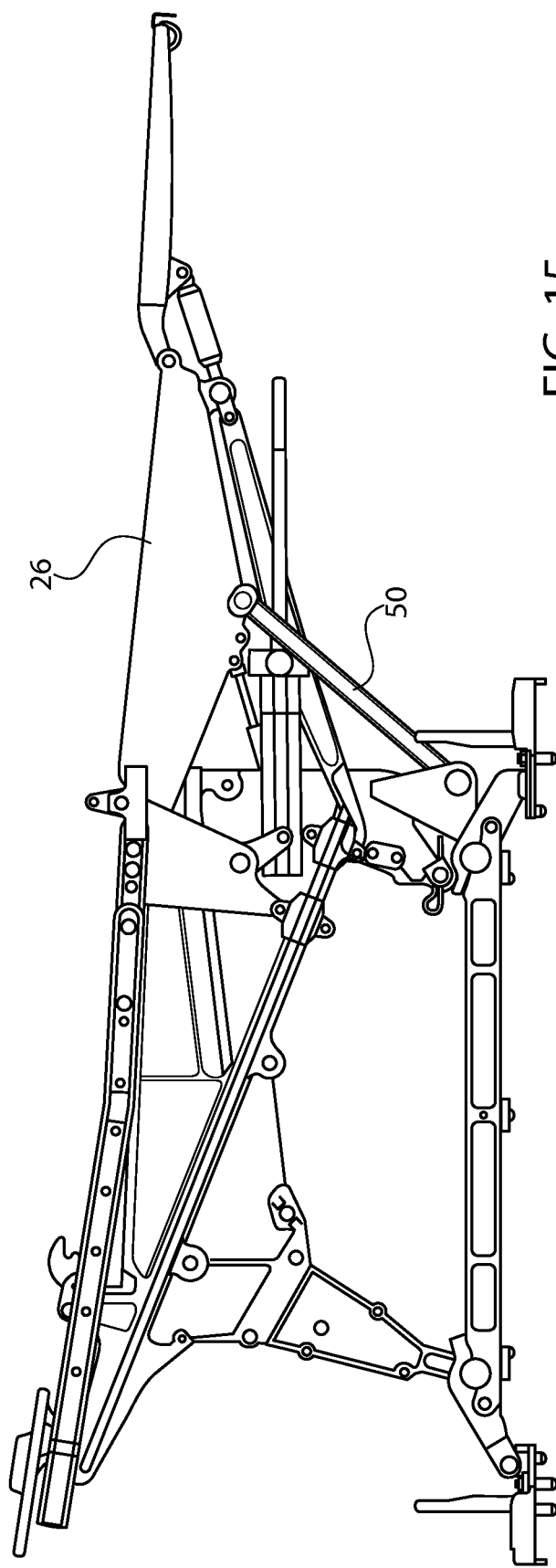
FIG. 15 shows a side cross sectional view of the seat of FIG. 12 in a bed-like position.

The movable portion 24 of the seat includes a seat pan 26, which has a cushioned seat 28 positioned thereon. Seat pan 26 is attached to a backrest 30 by a pivot point 32. The backrest 30 may also be linked to a carriage 34 via a second pivot point 36. The carriage 34 serves to support and guide movement of the backrest 30, as described below. (As shown in FIGS. 13-15, a footrest 38 is also associated with the movable seat portion 24, and footrest 38 extends out when the seat is in the intermediate to fully reclined positions.)

The movement of the seat pan 26 and the back rest 30 is guided by the combined movement of the first and second slides 20, 22. Seat pan 26 and backrest 30 may have rollers that are attached thereto and that cooperate with a groove or track in the slides. Alternate gliding systems are possible and considered within the scope of this invention. The movement of the carriage 34 moves along second slide 22 to move the backrest 30 to various positions, while the backrest is also moved by seat pan movement along the first slide, because the backrest and the seat pan are secured. At the same time that the backrest 30 moves to a more reclined position, the seat pan 26 is caused to slide forward along first slide 20. The forward motion of the seat allows for clearance behind the backrest so that the backrest can be moved to a flat position, even in the presence of a privacy shell or partition (P).

Figure 2:
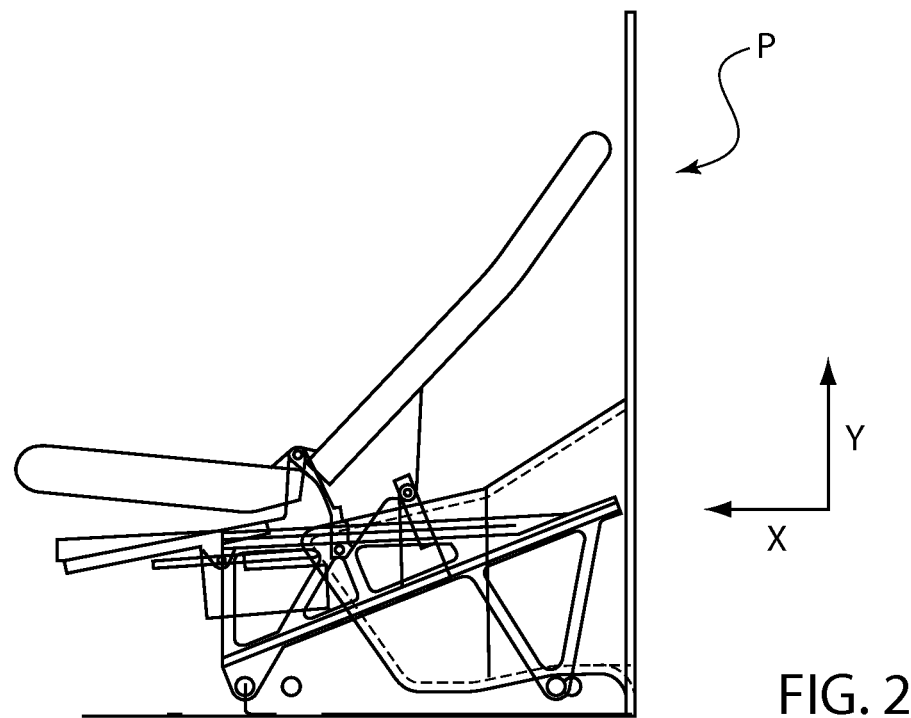
FIG. 2 shows the seat assembly of FIG. 1 in an early reclining position.
Figure 3:
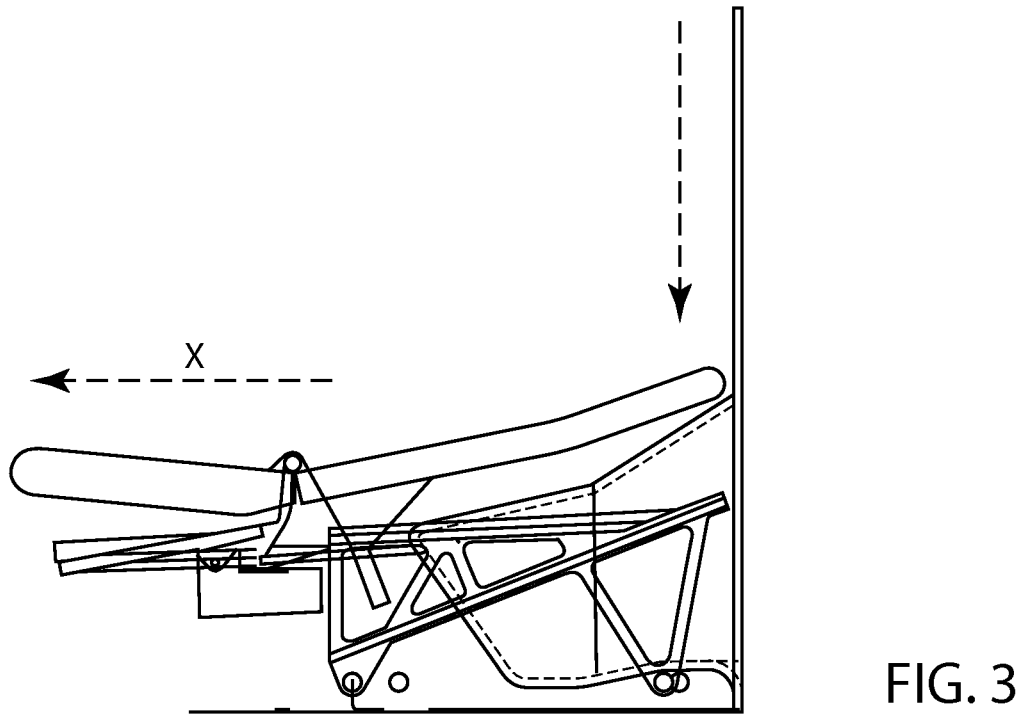
FIG. 3 shows the seat assembly of FIG. 1 as it nears a bed-like position.
Figure 4:
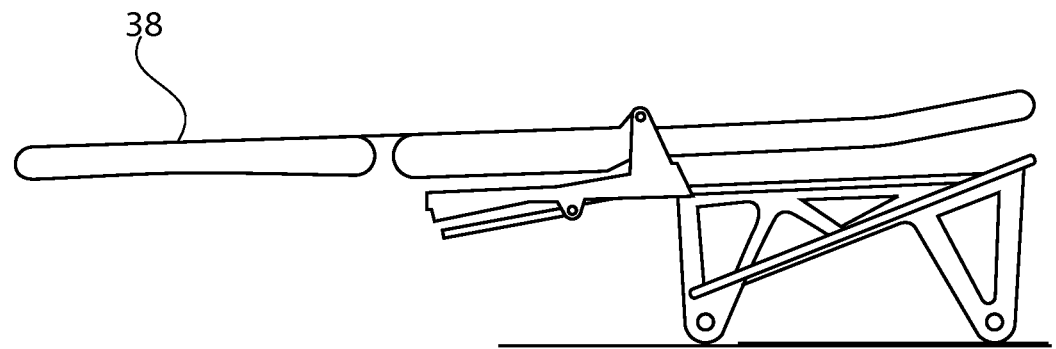
FIG. 4 shows the seat assembly of FIG. 1 in a substantially flat, bed-like position.

The presence of two slides 20, 22 provides for two simultaneous movements of the seat assembly. One movement is a back or forward movement of the seat in the X axis, and the other movement is an up or down movement of the seat back in the Y axis. (For example, if a point is marked on the seatback head rest, it would generally move down, in the Y axis, as the seatback is reclined.) Examples of this movement are shown in FIGS. 2-4. FIG. 2 shows the seat assembly moving (generally in the X axis) toward an intermediate position and the seat back moving (generally in the Y axis) backwards; FIG. 3 shows a further reclined position; and FIG. 4 shows the back rest in a substantially or generally horizontal position with the foot rest 38 employed.

A single linear actuator 40 may be positioned between one point of the movable seat and one point of the movable backrest. For example, the actuator may be a single actuator having one end associated with the movable seat pan and one end associated with the backrest. The associated ends may either be directly attached to the movable portions, or indirectly attached (such as by being attached to the carriage, an extending bar, or any other portion of the movable elements.) By being associated with the movable seat pan and the back rest, the single actuator is operable to move both portions simultaneously.

Providing a design that uses only a single actuator between two moving parts is believed to help reduce the weight of the seat system, help reduce the cost of the seat system, and help reduce the maintenance needs of the seat system. (Typically, in seats that use two slides, one end of one seat actuator is attached to a fixed potion of the seat and a second end of the actuator is attached to a movable part of the seat.) The current design, instead, uses one actuator in between two moving parts.

Figure 5:
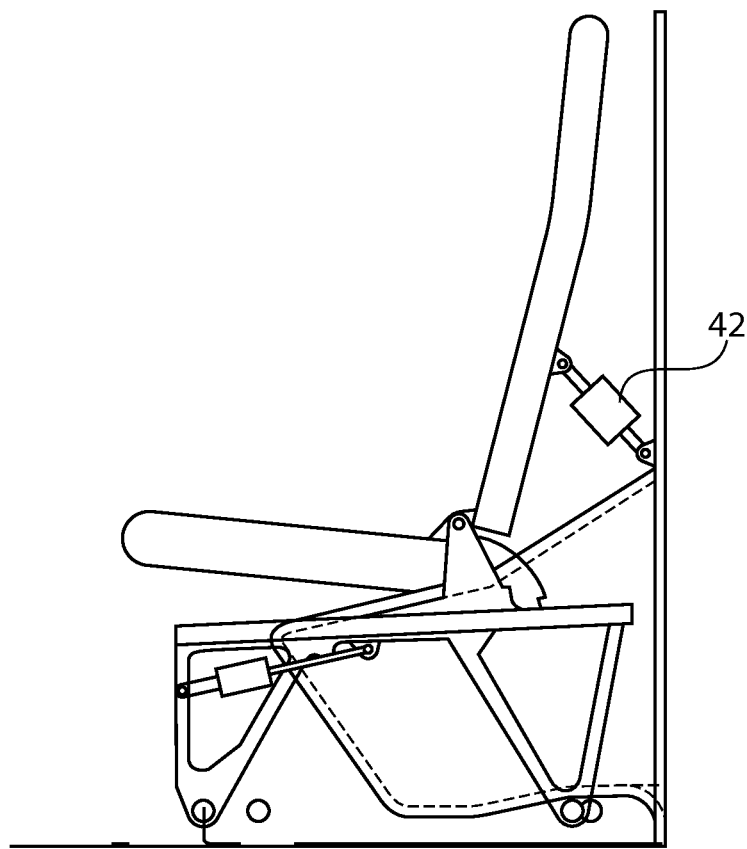
FIG. 5 shows the seat assembly of FIG. 1 with a second actuator.

It is understood, however, that is possible to use more than one actuator. For example, in one embodiment, there is provided a second actuator 42 between the carriage and the backrest in order to provide independent back adjustment capabilities, as shown in FIG. 5. Additionally, although it is more common and expected for the seat movement to be controlled by kinematics, it is possible for the seat to move manually (much like a home recliner that can be controlled by a pull lever).

Figure 6:
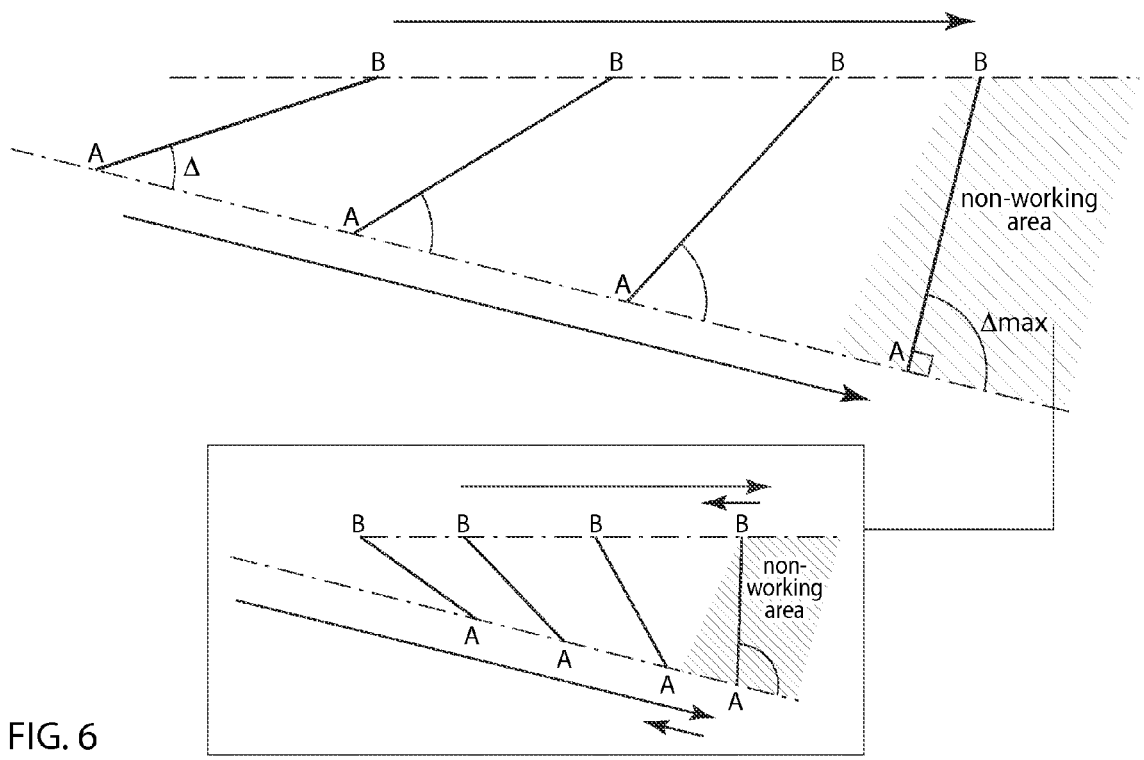
FIG. 6 shows a schematic of non-parallel slides.
Figure 7:
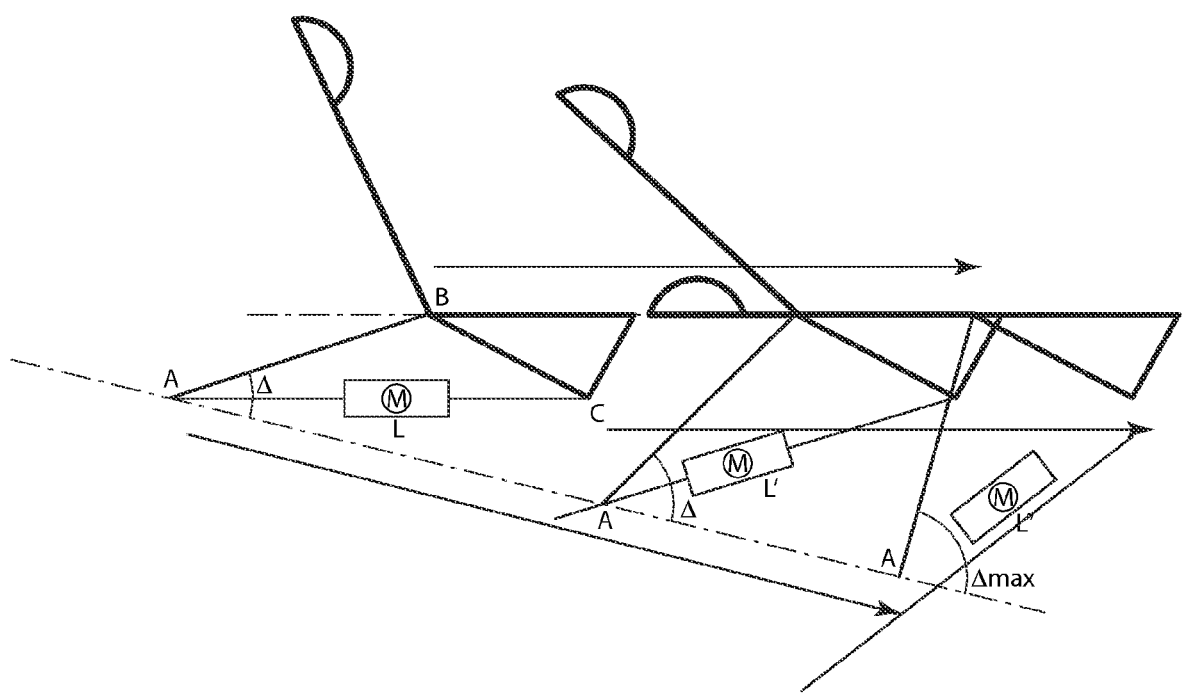
FIG. 7 shows a schematic of a positionable seat with a constant seat pan angle during conversion from an upright position to a bed-like position.

FIGS. 6 and 7 provide schematics that illustrate one embodiment of how the first slide 20 and the second slide 22 may be oriented. For example, line B in the schematic illustrates first slide 20, and line A illustrates second slide 22. By allowing the movable seat portions (including the seat pan and the carriage/backrest) to move freely along the lines or slides, there are unique seat positions obtained. Depending upon the starting position (and excluding the extreme shaded positions, where the system is not stable), for each position of A point, there is only one possibility for the position of point B, and one possibility for the angle of the AB segment compared to a defined baseline. For one specific angle of the AB segment compared to a defined baseline, there is a unique position for points A and B, along the straight lines/slides. By providing non-parallel slides A and B, it is possible to change the angle of the segment AB by moving B forward and A back or vice versa. As the angle of segment AB changes, the angle of the seatback changes and the position of the seat likewise changes.

In the schematic shown in FIG. 7, the seat back 30 is attached to the slides by both point A and B; A represents movement of the carriage 34 and B represents movement of the seat pan 26 (to which the backrest is attached). The seat pan 26 is attached to and translates along the first slide 20. A linear actuator (represented by M) is associated on one end with the backrest 30 at point A, and on its other end to the seat pan 26 at point C.

Due to the relative angle between the two slides, for any distance between these two attachment points, there is a unique seat position. This unique seat position is summarized by the relative position of the movable part of the seat pan 26 from the seat base frame 12 and the back recline angle. A schematic of the reclining action and changing angles is shown in FIG. 7.

Thus, even by using only one actuator, it is possible to adjust the recline of the back (directly linked to AB segment orientation) and the horizontal position of the seat (position of point B in this example). Adjusting or changing the length of the AC segment changes the shape of the triangle and all relative angles. The design of all the components and the relative angle of the two slides allow the trajectory for the most aft point of the backrest to be very close to vertical or to the line generally perpendicular to the cabin floor between the two extreme positions of the seat (the most upright and the bed positions). Doing so, the passenger living space is optimized. In this example the back recline is adjustable, but the rake (seat pan angle) will remain the same whatever the seat position.

Figure 8:
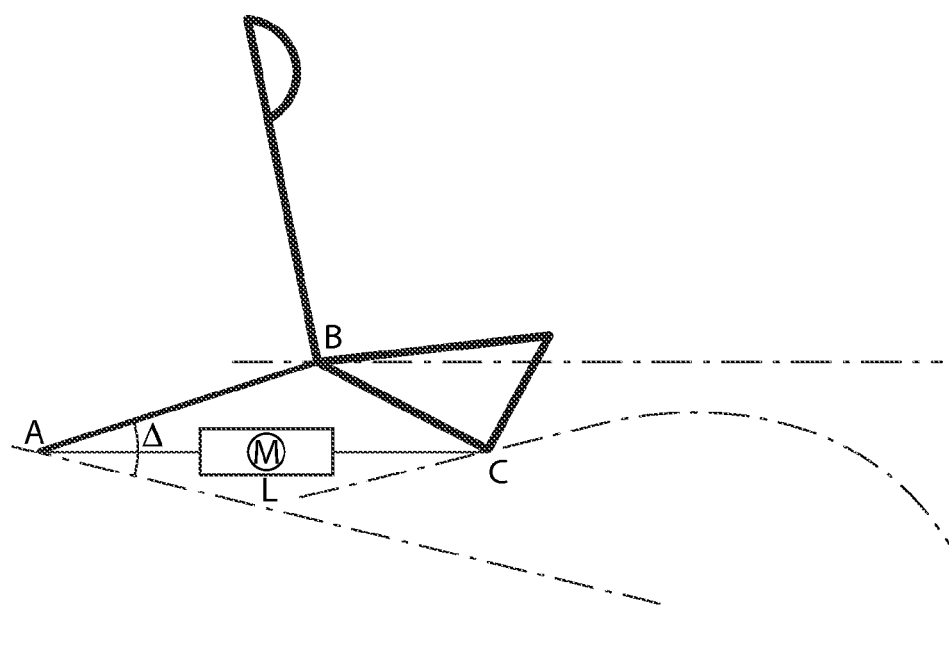
FIG. 8 shows a schematic of an alternate seat with a inclinable, optimized seat pan.
Figure 9:
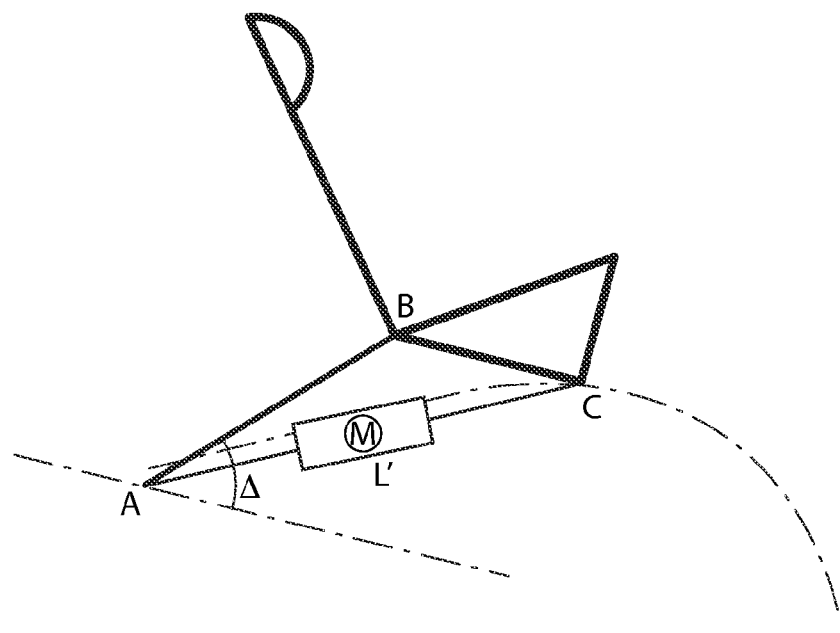
FIG. 9 shows the seat assembly of FIG. 8 in a reclining position.
Figure 10:
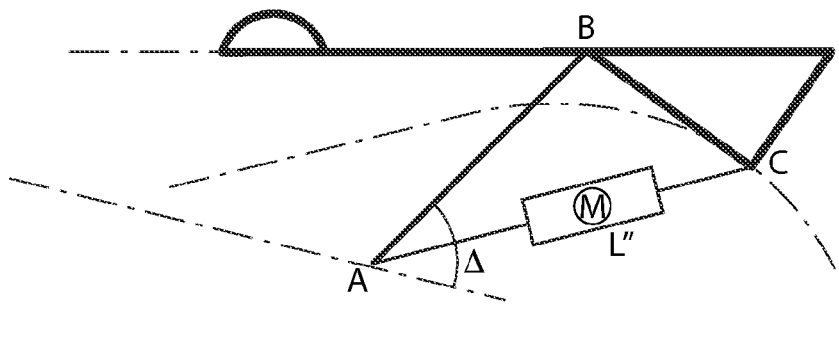
FIG. 10 shows the seat assembly of FIG. 8 in a bed-like position.
Figure 11:
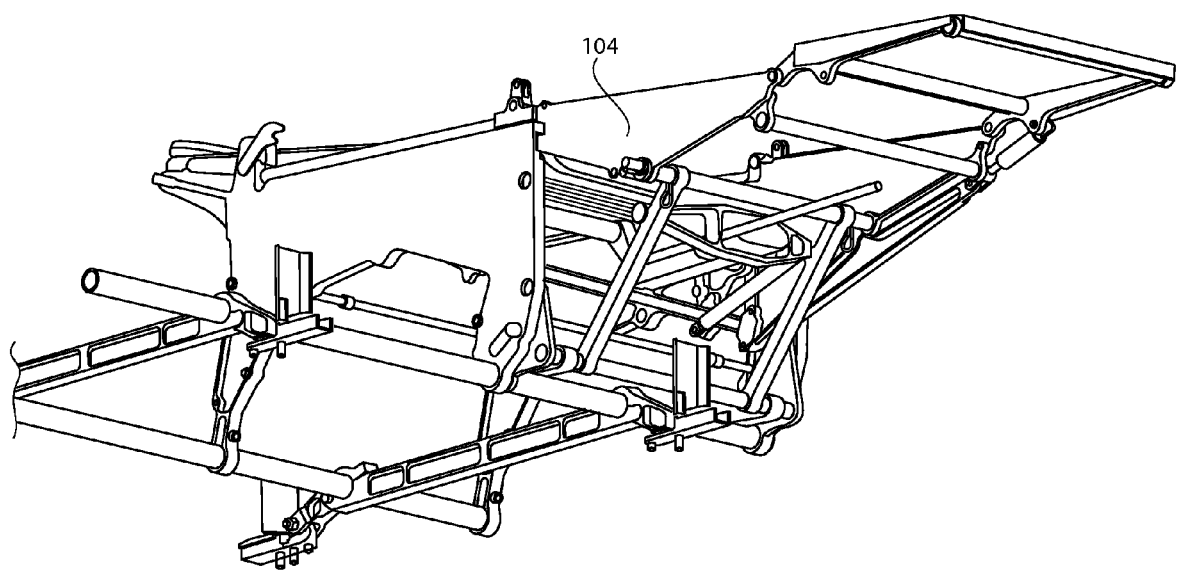
FIG. 11 shows a cross sectional view of a seat assembly in the bed-like position.

In an alternate embodiment, the rake (seat pan angle) may be made adjustable. This adjustable embodiment is generally similar to the above, but instead of the seat pan 26 translating on the first slide 20, the seat pan 26 is attached to the slide 20 at point B, and also attached a non-linear slide which follows curve 44/C. FIGS. 8-10 provide schematics showing this arrangement through the range of motion. Non-linear slide is designed in such a manner that the rake (seat pan angle) is increasing between the most upright position (shown in FIG. 8) up to an intermediate seat position (shown in FIG. 9), and then decreasing up to the bed position (shown in FIG. 10). The arcuate curve of the seat is controlled by two parts, a slide 44 which is controlled by a groove, and then an arcuate curve that is controlled by a linkage 50, described below.

In the seat's most upright position, the rigid AB segment controls the backrest. When that segment is moved (i.e., when the angle is changed), the backrest is adjusted. Point B of the seat pan moves along a portion of a linear slide 20.

As shown more clearly in FIG. 13, in one embodiment, the travel of point C is controlled by a roller 46 travelling in a groove 48 for its linear portion, and then being supported by a solid double linkage 50 once exiting the groove. Double linkage 50 includes two arms 52, 54 joined at a pivot 56. Linkage 50 forces the seat pan 26 to travel through the arc C when the seat is moved outwardly, which causes the rake of the seat to raise and lower (or causes the angle of the seat with respect to horizontal increase and decrease). This outward seat movement and the corresponding movement of linkage 50 is illustrated by FIGS. 13-15. In FIG. 13, linkage 50 is hinged at pivot point 56 so that its arms 52, 54 are elbowed, allowing arm 52 to pivotally move about an arc. In the seat's upright position, the roller 46 is supported by the groove 48. In FIG. 14, the seat is moving outwardly and the roller 46 is about to leave the groove. When the seat is in the bed-like position and extended as flat as possible, as shown in FIG. 15, the seat pan 26 is supported by the double linkage 50. Referring back to the schematics, as the seat is moving forward, the angle of the seat increases. The length L of the AC segment controls the seat horizontal position (B position on slide 20), the back angle, and the seat rake.

Changes and modifications, additions and deletions may be made to the structures and methods recited above and shown in the drawings without departing from the scope or spirit of the invention and the following claims.

What is claimed is:

1. A positionable seat assembly for an aircraft, comprising:
   (a) a movable seat pan and a movable backrest,
   (b) a fixed seat base frame having a first slide and a second slide, wherein the first slide and the second slide are generally non-parallel to one another, wherein the movable seat pan is attached to the first slide and wherein the movable backrest is linked to a carriage that guides movement of the backrest along the second slide, and wherein the seat pan and the backrest pivot with respect to one another about a pivot point; and
   (c) a single linear actuator having one end associated with the seat pan and one end associated with the backrest carriage, such that both ends of the actuator are associated with moving parts;
   wherein any change in the length of the linear actuator will force the seat pan and the backrest carriage to move along the slide which they are respectively attached to, to a unique possible position, modifying the seat pan position and the back rest recline angle.

2. The seat assembly of claim 1, wherein the seat assembly is configured to be positionable in an upright position, in a bed-like position, and in any number of positions therebetween.

3. The seat assembly of claim 1, wherein the backrest is linked to the carriage about a pivot point.

4. The seat assembly of claim 1, wherein the first slide is generally horizontal.

5. The seat assembly of claim 1, wherein the second slide has a generally upward incline toward a back of the seat assembly.

6. The seat assembly of claim 1, further comprising a footrest that extends when the seat assembly is in a bed-like position.

7. The seat assembly of claim 1, further comprising a second actuator associated with the backrest, configured to provide back adjustment independent from the seat pan adjustment.

8. The seat assembly of claim 1, wherein the seat is configured to have an angled rake during adjustment between an upright position and a bed-like position.

9. The seat assembly of claim 1, wherein the seat assembly is installed in a cabin of an aircraft.

* * * * *